US009576287B1

(12) United States Patent
Kalinichenko et al.

(10) Patent No.: US 9,576,287 B1
(45) Date of Patent: Feb. 21, 2017

(54) PAYMENT EVENT FEED

(71) Applicant: Square, Inc., San Francisco, CA (US)

(72) Inventors: Alexey Kalinichenko, San Francisco, CA (US); Simo Leone, San Francisco, CA (US); Abhay Kumar, San Francisco, CA (US); Austin Broyles, San Francisco, CA (US); Matt Mihic, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 376 days.

(21) Appl. No.: 13/802,630

(22) Filed: Mar. 13, 2013

Related U.S. Application Data

(60) Provisional application No. 61/748,430, filed on Jan. 2, 2013.

(51) Int. Cl.
*G06Q 40/00* (2012.01)
*G06Q 20/40* (2012.01)

(52) U.S. Cl.
CPC .................................... *G06Q 20/40* (2013.01)

(58) Field of Classification Search
CPC ........ G06Q 20/00; G06Q 20/14; G06Q 30/00; G06Q 40/00; G06F 17/30; G06F 15/16; G06F 17/60
USPC ...................................................... 705/35–44
See application file for complete search history.

(56) References Cited

U.S. PATENT DOCUMENTS 9,129,321 B2 * 9/2015 Boding .................. G06Q 30/06
2005/0119972 A1 * 6/2005 Inglis ..................... G06Q 20/02 705/40
2010/0205078 A1 * 8/2010 Lawrence .............. G06Q 20/02 705/34
2011/0016052 A1 * 1/2011 Scragg ................... G06Q 20/02 705/44
2013/0173464 A1 * 7/2013 Quillian ................. G06Q 40/02 705/40

OTHER PUBLICATIONS

Strickland, J. et al. *How Twitter Works*. HowStuffWorks.com. Published Dec. 17, 2007. Retrieved on Nov. 7, 2014. Retrieved from the Internet: URL<http://computer.howstuffworks.com/internet/social-networking/networks/twitter2.htm/printable>. 5 pages.

Dwyer, B. *Credit Card Processing: How it Works*. CardFellow.com. Published prior to Jun. 2011. Retrieved on Nov. 7, 2014. Retrieved from the Internet: URL<http://www.cardfellow.com/blog/how-credit-card-processing-works/>. 4 pages.

* cited by examiner

*Primary Examiner* — Olabode Akintola
(74) *Attorney, Agent, or Firm* — Perkins Coie LLP

(57) ABSTRACT

Methods, systems, and apparatus, including computer programs encoded on computer storage media, for processing payment events. One of the systems includes one or more processing engines configured to periodically retrieve information from a payment event feed that comprises a list of payment events in an order, and a server configured to perform a sequence of steps for a payment transaction, the sequence of steps including receiving a request for authorization of the payment transaction from a merchant, receiving an indication that the payment transaction has been authorized, and sending authorization to the merchant for the payment transaction without receiving acknowledgment that the one or more transaction processing engines have received the request for authorization, wherein the server is configured to record completion of each step in the sequence of steps as a payment event in the list of payment events to generate the payment event feed.

25 Claims, 5 Drawing Sheets

200

210 220

| ID | Payment Event Description |
|---|---|
| 1 | Request for authorization in transaction 274 received from merchant A |
| 2 | Payment request for transaction 274 routed to card issuer |
| 3 | Request for authorization in transaction 823 received from merchant B |
| 4 | Approval for transaction 274 received from card issuer |
| 5 | Approval for transaction 274 routed to merchant |
| 6 | Payment request for transaction 823 routed to card issuer |
| 7 | Approval for transaction 823 received from card issuer |

PAYMENT EVENT FEED

CROSS-REFERENCE TO RELATED APPLICATIONS

This application claims the benefit under 35 U.S.C. §119(e) of the filing date of U.S. Provisional Patent Application No. 61/748,430, filed on Jan. 2, 2013, entitled "Payment Event Feed," the entirety of which is herein incorporated by reference.

TECHNICAL FIELD

This disclosure relates to processing payment transactions.

BACKGROUND

In a conventional point-of-sale electronic credit card transaction, the transaction is authorized and captured over a network connection. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture stage can trigger the financial transaction between the card issuer and the merchant, and optionally creates a receipt. There can also be other entities, e.g., the card acquirer, in the route of the transaction. Debit card transactions have a different routing, but also require swiping of the card.

SUMMARY

The specification describes how a system can generate a payment event feed from payment events that represent completed steps of a particular purchase transaction. Instead of having an online dependency on back end processing engines receiving data about steps of a payment transaction, a system can generate an ordered payment event feed of payment events that represent the steps of purchase transactions in the system. Back end processing engines can then request and obtain payment events on the payment event feed.

In general, one innovative aspect of the subject matter described in this specification can be embodied in a system that includes one or more processing engines configured to periodically retrieve information from a payment event feed that comprises a list of payment events in an order; and a server configured to perform a sequence of steps for a payment transaction, the sequence of steps including receiving a request for authorization of the payment transaction from a merchant, receiving an indication that the payment transaction has been authorized, and sending authorization to the merchant for the payment transaction without receiving acknowledgment that the one or more transaction processing engines have received the request for authorization, and wherein the server is configured to record completion of each step in the sequence of steps as a payment event in the list of payment events to generate the payment event feed. Other embodiments of this aspect include corresponding methods, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Each processing engine maintains a reference to the last-retrieved payment event, and requests payment events on the payment event feed by specifying the identifier of the last-retrieved payment event. Payment events on the payment event feed are ordered by payment event identifiers. The server is further configured to reconcile inconsistent payment events in the list of payment events.

In general, another innovative aspect of the subject matter described in this specification can be embodied in methods that include the actions of receiving, at a server, a request for authorization of a payment transaction from a merchant; receiving an indication that the payment transaction has been authorized; providing authorization for the payment transaction to the merchant without receiving acknowledgment that one or more processing engines have received the indication that the payment transaction has been authorized; generating one or more payment events associated with the payment transaction, including converting steps of the payment transaction into multiple payment events, wherein each payment event has an unique identifier; and providing one or more payment events to one or more processing engines. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include generating the unique identifier for each payment event, wherein the unique identifier is based on a time-based ordering in which the payment events occurred. The actions include generating respective unique identifiers for the payment events as monotonically increasing numbers. The actions include generating a payment event feed from the one or more payment events, wherein the payment event feed comprises a list of payment events ordered by respective payment event identifiers. Generating the payment event feed comprises reconciling inconsistent payment events from the plurality of payment events.

In general, another innovative aspect of the subject matter described in this specification can be embodied in methods that include the actions of obtaining a plurality of payment events from each of a plurality of servers, wherein each payment event is associated with a payment transaction and has an identifier; reconciling inconsistent payment events from the plurality of payment events; generating a payment event feed from the plurality of reconciled payment events, wherein the payment event feed comprises a list of payment events in an order determined by the payment event identifiers; receiving a request for one or more payment events from one or more processing engines; and providing one or more payment events from the payment event feed in response to a request. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include receiving a request for one or more recently-added payment events on the payment event feed, wherein the request includes an identifier; and in response to the request, providing one or more payment events that occur on the payment event feed after the payment event associated with the identifier. Generating the payment event feed comprises adding each payment event associated with a payment transaction to the payment event feed no more than once.

Advantages may include one or more of the following. A customer can successfully conduct a point-of-sale electronic payment transaction with a merchant using a mobile device even if back end services are down when processing the payment transaction. Payment events can be reconciled and checked for consistency, which provides a consistent view of events for back end services. Using a payment event feed simplifies the interface between back end processing engines and front end servers that are handling payment transactions. This also makes the implementation and rollout of new back end systems faster and easier, for example, for real-time analysis and visualization. The append nature of the payment event feed provides a more scalable system that can support a larger number of back end systems. The reconciled payment events on the payment event feed can keep multiple geographically-diverse redundant sites synchronized and can facilitate disaster recovery.

From a customer and a merchant's perspectives, the payment service system can approve a transaction so that both the customer and the merchant are unaffected by any problems with back end processing engines. Therefore, both experience a more satisfactory buying and selling experience, respectively.

BRIEF DESCRIPTION OF THE DRAWINGS

FIG. 2 is a diagram of an example payment event feed.

Like reference numbers and designations in the various drawings indicate like elements.

DETAILED DESCRIPTION

Figure 1:
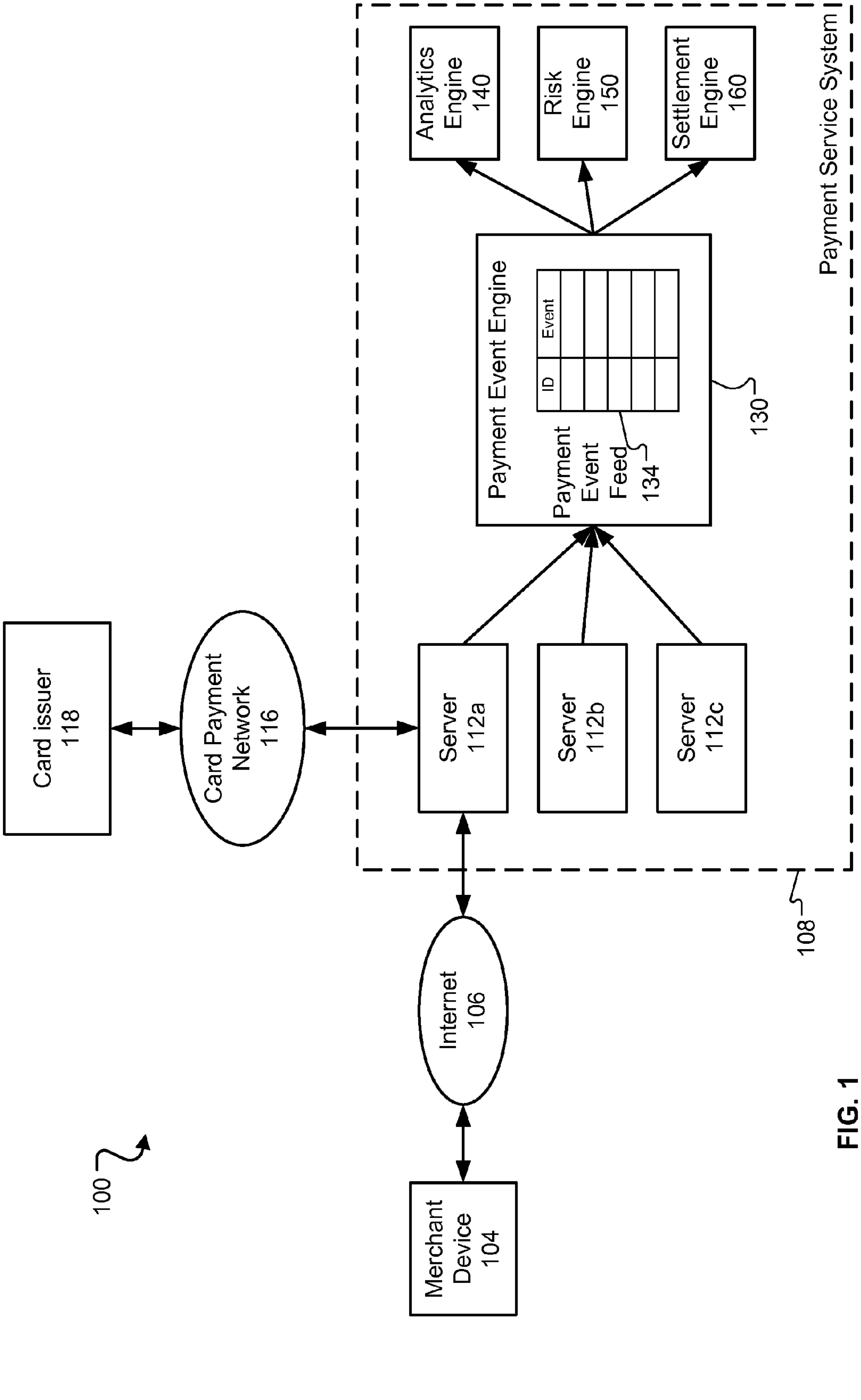
FIG. 1 is a schematic illustration of the architecture of an example payment system

FIG. 1 is a schematic illustration of the architecture of an example payment system 100. The overall system 100 includes a merchant device 104 and a payment service system 108 connected by a network, e.g., the Internet 106. The merchant device 104 can be a mobile computing device, i.e., a hand-held computing device, capable of running software applications, e.g., a smartphone or tablet computer. However, the merchant device 104 can also be a a desktop computer, a laptop computer, a dedicated point of sale system, or other data processing apparatus.

A payment processor operates a payment service system 108. The merchant device 104 communicates with the payment service system 108 using the network 106. The payment service system 108 includes one or more servers 112, at least some of which can handle secure transactions (e.g., using a secure server), to process transactions with the merchant device 104. In general, servers 112 can store public merchant information such as the merchant's address or phone number. The servers 112 also handle secure information such as credit card numbers, debit card numbers, bank accounts, user accounts, user identifying information or other sensitive information.

To initiate a transaction, the merchant device 104 provides a request for authorization of the transaction to one of the servers 112, e.g. server 112*a*. The payment service system 108 in turn communicates with a computer system 116 of a card payment network, e.g., Visa or MasterCard. The payment service system 108 can communicate with a computer system 116 over the same network 106 used to communicate with the merchant device 104, or over a different network. The computer system 116 of the card payment network can communicate in turn with a computer system 118 of a card issuer, e.g., a bank. There can also be computer systems of other entities, e.g., the card acquirer, between the payment service system 108 and the card issuer. The payment service system 108 communicates the result of the request for authorization, e.g. authorized or not authorized, back to the merchant device 104.

During the capture stage of the transaction, a similar sequence of events occurs between the merchant device 104, the payment service system 108, and the computer system 118 of the card issuer. The merchant device 104 sends details of the completed purchase to the payment service system 108, which the payment service system 108 routes to the computer system 118 of the card issuer. The computer system 118 of card issuer in turn communicates result of the payment transaction back to the payment service system 108, which routes the result of the payment transaction back to the merchant device 104.

Servers 112*a-c* can generally associate the steps of a particular purchase transaction with a transaction identifier. The servers 112*a-c* can generate a unique transaction identifier for each new transaction requested by a merchant, e.g., for each new request for authorization received from the merchant device 104. The payment service system 108 can for example index purchase transactions by transaction identifiers. Servers 112*a-c* can then determine the status of a particular purchase transaction by referencing a transaction identifier for the purchase transaction.

The system can generate payment events that each represents a particular step of a purchase transaction. Payment events can include an authorization, a capture, a void, or a refund for a particular transaction being requested, succeeding, being routed to or received from an entity, failing, or encountering other kinds of errors. For example, payment events can include (1) a request for authorization for a transaction is received from a merchant, (2) a request for authorization for a transaction is routed to a card issuer, (3) an indication of a request for authorization being approved by a card issuer is received, (4) an indication of a request authorization being declined by a card issuer is received, (5) an indication of a request for authorization being approved by a card issuer is routed to a merchant, (6) an indication of a request for authorization being declined by a card issue is routed to a merchant, (7) an indication of a payment transaction being voided is received from a card issuer, (8) a request for a refund is received from a merchant, (9) a request to void a transaction is received from a merchant. Other types of payment events can also be used.

Payment events generated in the system can be consumed by a number of back end processing engines. The back end processing engines are "back end" in the sense that the flow of a payment transaction may not depend on input or output from the processing engines. Rather, the processing engines can access payment events and perform calculations asynchronously from the payment transaction, which can be minutes, days, or weeks later.

For example, an analytics engine 140 can process payment events to compute various statistics, for example, gross monthly payments processed or average purchase price per merchant. A risk engine 150 can process payment events to identify trends in payment events that indicate an increased risk of fraud. A settlement engine 160 can process payment events to finalize transactions. Other kinds of back end processing engines can also be implemented to consume events on the payment event feed. For example, a backup processing engine can request payment events from the payment event feed and distribute the payment events to multiple geographically-diverse sites. These reconciled and redundantly stored payment events can then be used to keep the multiple sites synchronized and for disaster recovery purposes.

The back end processing engines can be implemented on any appropriate type of computing device that includes one or more processors and computer readable media. As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

Each server 112 can provide payment events to the back end processing engines as the payment events occur during the course of processing a payment transaction. However, occasionally, one or more of the back end processing engines can experience problems due to network latency or hardware outages. In such cases, a server 112 should avoid waiting for a back end processing engine to acknowledge receipt of a particular payment event in order to avoid blocking progress of the purchase transaction.

Instead, the payment service system 108 can generate a payment event feed 134 that records completion of each step in the sequence of steps of a particular purchase transaction as a distinct payment event. The payment service system 108 assigns a unique identifier to each payment event, and the payment service system can order the payment event feed 134 by the identifiers. In some implementations, the payment event feed 134 is a list of the individual payment events. The payment service system 108 can index the events of the payment event feed by the payment event identifiers so that back end processing engines can access a payment event by referencing a payment event identifier for the payment event.

In some cases, inconsistencies may arise for payment events belonging to a particular purchase transaction. Inconsistencies can arise due to a single merchant device communicating conflicting information to different servers 112 within the payment service system 108. Inconsistencies can also arise due to errors by an operator of the merchant device 104, e.g. swiping a payment card multiple times, errors in in the card payment network 116, errors due to malfunctioning software, or other errors. Example conflicting payment events include a capture and a void for a same transaction, two authorizations and a capture for a single transaction, a void and a refund for the same transaction, and duplicate payment events.

Therefore, as part of generating the payment event feed 134, the servers 112 can provide details of purchase transactions to a payment event engine 130. The payment event engine 130 can access the payment events of a particular purchase transaction by referencing a transaction identifier of the purchase transaction. The payment event engine 130 can then reconcile inconsistencies in the payment events of the purchase transaction and assign unique identifiers to the reconciled payment events. The payment event engine 130 can then generate payment event feed 134 using the reconciled payment events and associated payment event identifiers. Like the back end processing engines, the payment event engine 130 can be implemented on any appropriate type of computing device that includes one or more processors and computer readable media.

For example, the payment event engine 130 can receive two duplicate authorization request events from server **112*a* and instead generate a single corresponding payment event for the payment event feed 134. As another example, the payment event engine 130 can receive from server 112*a* a "void" payment event and a "refund" payment event for the same transaction. The payment event engine 130 can determine which payment event is correct and generate a single corresponding payment event for the payment event feed 134**.

FIG. 2 is a diagram of an example payment event feed 200. The example payment event feed 200 is implemented as a list of payment events. Each payment event has an associated payment event description 220 and an identifier 210. For example, payment event 221 has a description "Request for authorization in transaction 274 received from merchant A," and an identifier of "1." Although shown as a list, other data structures that maintain an ordering defined by identifiers can also be used, e.g. a heap. In this example, the description of the payment event with payment event identifier of "1" includes the transaction identifier "274" of the transaction from which it originated.

In some implementations, the system ensures that the identifiers assigned for payment events in a particular transaction correspond to a time-based ordering in which the payment events occurred. In other words, payment events that occurred first will occur first in the payment event feed.

Processing engines can request payment events from a payment event feed engine by specifying a payment event identifier. The payment event engine can respond to the request by providing all payment events with identifiers greater than the identifier specified. In some implementations, each processing engine maintains a reference to the identifier of the last-received payment event, and, on a subsequent request for payment events, needs only to specify the identifier of the last-received payment event.

Figure 3:
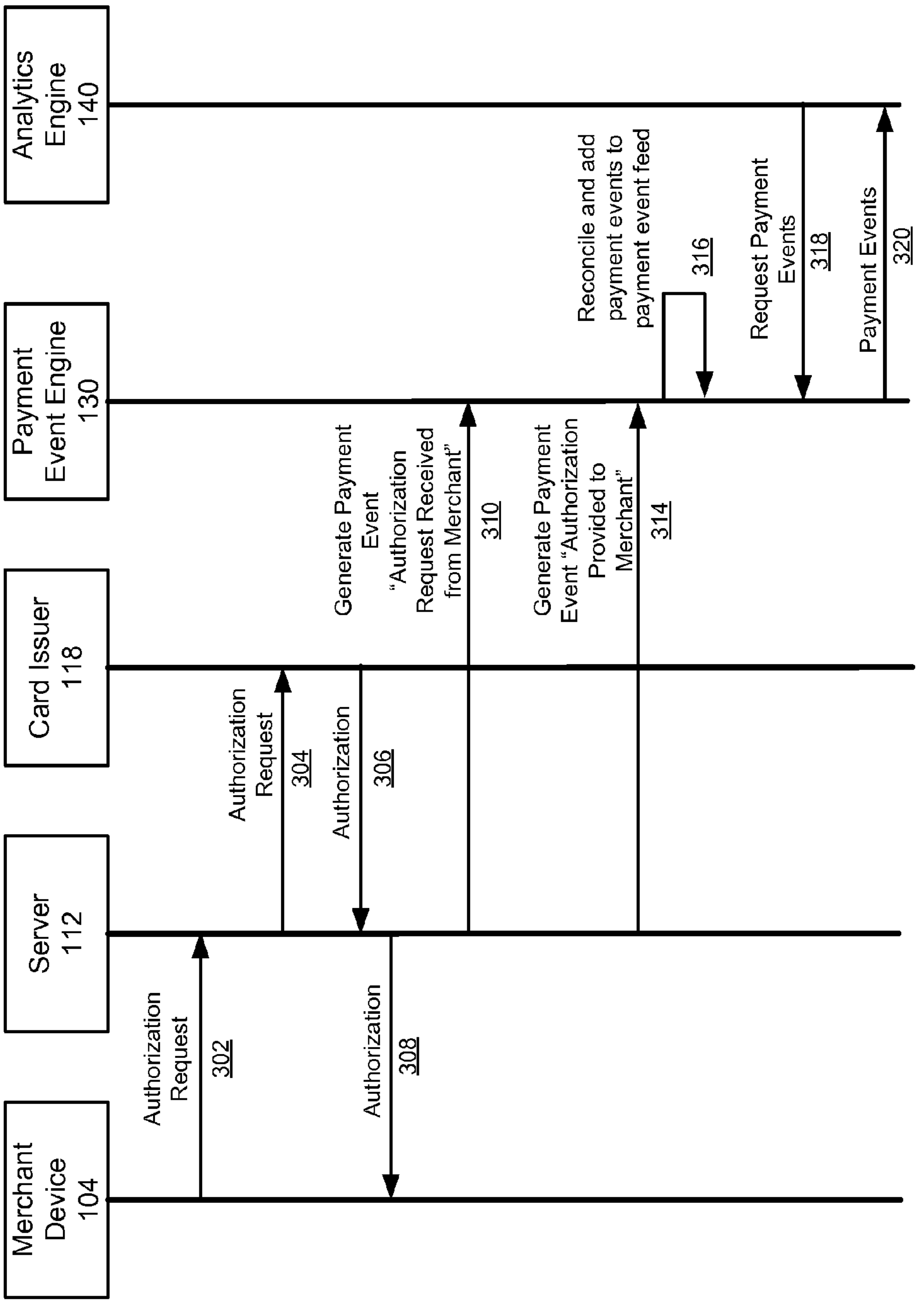
FIG. 3 is a sequence diagram illustrating payment events in an example payment transaction.

FIG. 3 is a sequence diagram illustrating the generation of payment events in an example payment transaction. In FIG. 3, a merchant device 104 initiates a purchase transaction, causing the system to generate corresponding payment events for steps of the payment transaction.

The merchant device 104 requests authorization for a payment transaction (302), and the server 112 routes the authorization request to a card issuer 118 (304). The card issuer 118 sends an authorization for (or a decline of) the payment transaction back to the server 112 (306), and the server 112 communicates the authorization (or the decline) back to the merchant device 104 (308).

In order to reduce the turnaround time for authorizing payment transactions, the server 112 can send the authorization for the payment transaction back to the merchant device 104 before receiving acknowledgement that any back end processing engines have received data related to the payment transaction. Instead of waiting for back end processing engines to acknowledge receipt of payment transaction data, the server 112 can instead generate corresponding payment events each representing completion of a particular step of the payment transaction and can provide the payment events to a payment event engine 130.

For example, the server 112 can generate a payment event corresponding to the authorization request being received from the merchant (310) and provide the payment event to the payment event engine 130. The server 112 can also generate a payment event corresponding to the authorization being sent to the merchant (314) and provide the payment event to the payment event engine 130.

The payment event engine 130 can then reconcile any inconsistent payment events received from the server 112 and add the payment events to a payment event feed (316). The payment event feed will now store an ordered record of payment events corresponding to the payment transaction, which can now be served to back end processing engines, and all occurring after the server 112 has sent authorization to the merchant device 104.

Sometime later, e.g. seconds, minutes, or days later, one or more of the back end processing engines, e.g., the analytics engine 140, can request payment events on the payment event feed from the payment event engine (318). For example, the engine can specify an identifier of its last-received payment event. In response, the payment event engine 130 can provide one or more, or all, payment events on the payment event feed occurring after the payment event specified by the identifier (320).

Figure 4:
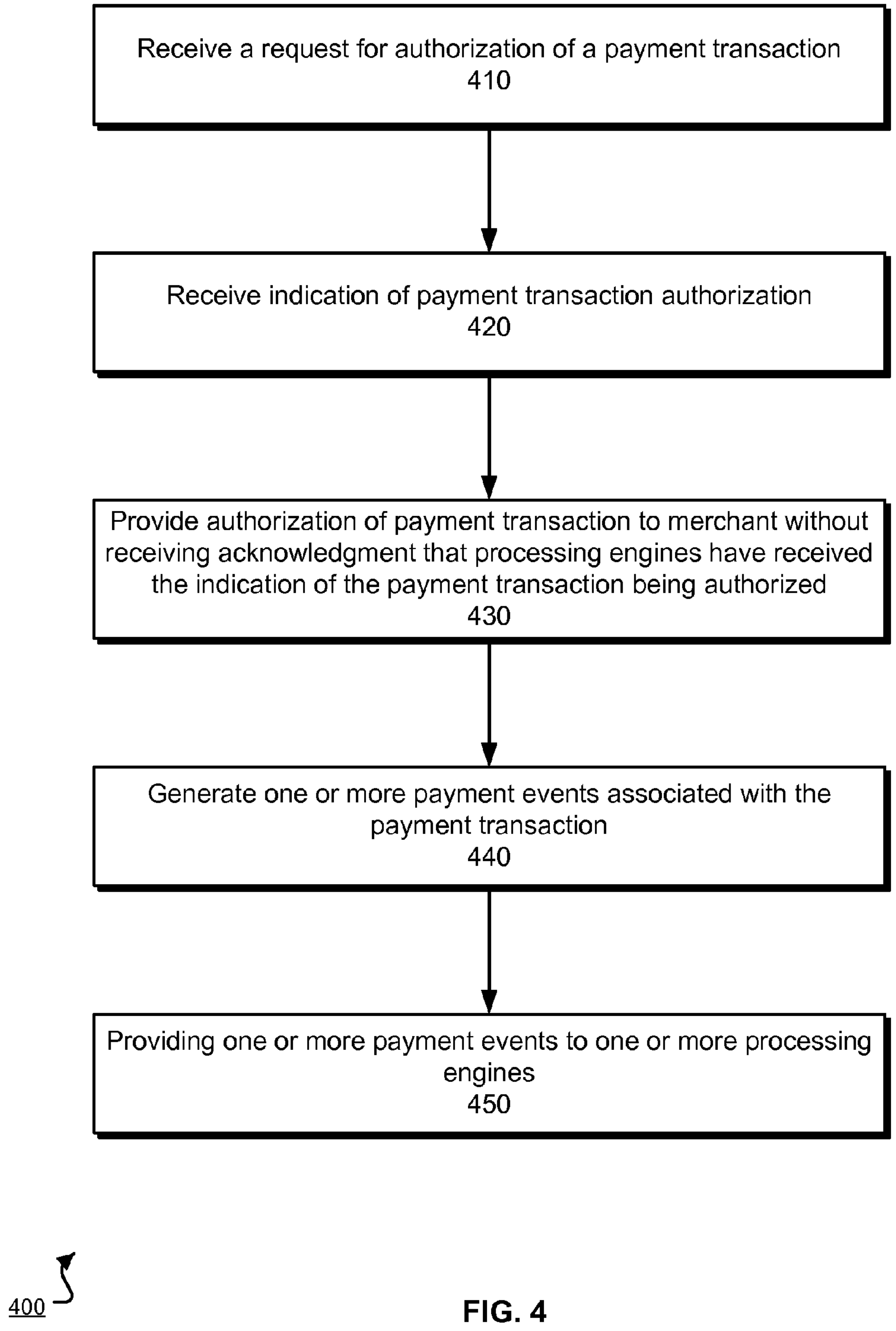
FIG. 4 is a flow chart of an example process for processing payment events.

FIG. 4 is a flow chart of an example process 400 for processing payment events. In general, a server receives a request for authorization of a payment transaction and the server generates corresponding payment events for completed steps of the payment transaction. The process 400 can be implemented, for example, as one or more computer programs installed on one or more computers. For convenience, the process 400 will be described as being performed by a system of one or more computers, e.g. the payment service system 108 of FIG. 1.

The system receives a request for authorization of a payment transaction (410). After receiving the request for authorization, the system can route the request for authorization to a computer system of a card issuer. The system then receives an indication that the payment transaction has been authorized (420).

The system sends authorization for the payment transaction to a merchant without receiving acknowledgment that one or more processing engines have received the indication of the payment transaction being authorized (430). Reducing online dependencies within a payment service system can reduce the time required to authorize a transaction for a merchant. Instead of waiting for acknowledgement that back end processing engines have received data relating to the authorization request, the system instead will send authorization for the payment transaction and generate payment events representing steps of the transaction.

The system generates one or more payment events associated with the payment transaction (440). The system can convert the steps of the payment transaction into multiple payment events and assign a unique identifier to each payment event. For example, the system can generate distinct payment events that represent the completion of routing the request for authorization to a card issuer or the completion of routing the authorization back to the merchant.

Payment event identifiers can be assigned in a variety of ways. In some implementations, the payment event identifiers are assigned as monotonically increasing numbers. The payment event identifiers can also be based on a time of day at which the transaction step corresponding to payment event occurred, or a time of day at which the payment event was generated.

The system provides one or more payment events to one or more processing engines (450). The system can, for example, generate an ordered payment event feed from the generated payment events, where the payment event feed is ordered according to the identifiers. When a back end processing engine requests payment events, the system can retrieve one or more most-recent payment events from the payment event feed and provide the most-recent payment events in response to the request.

Figure 5:
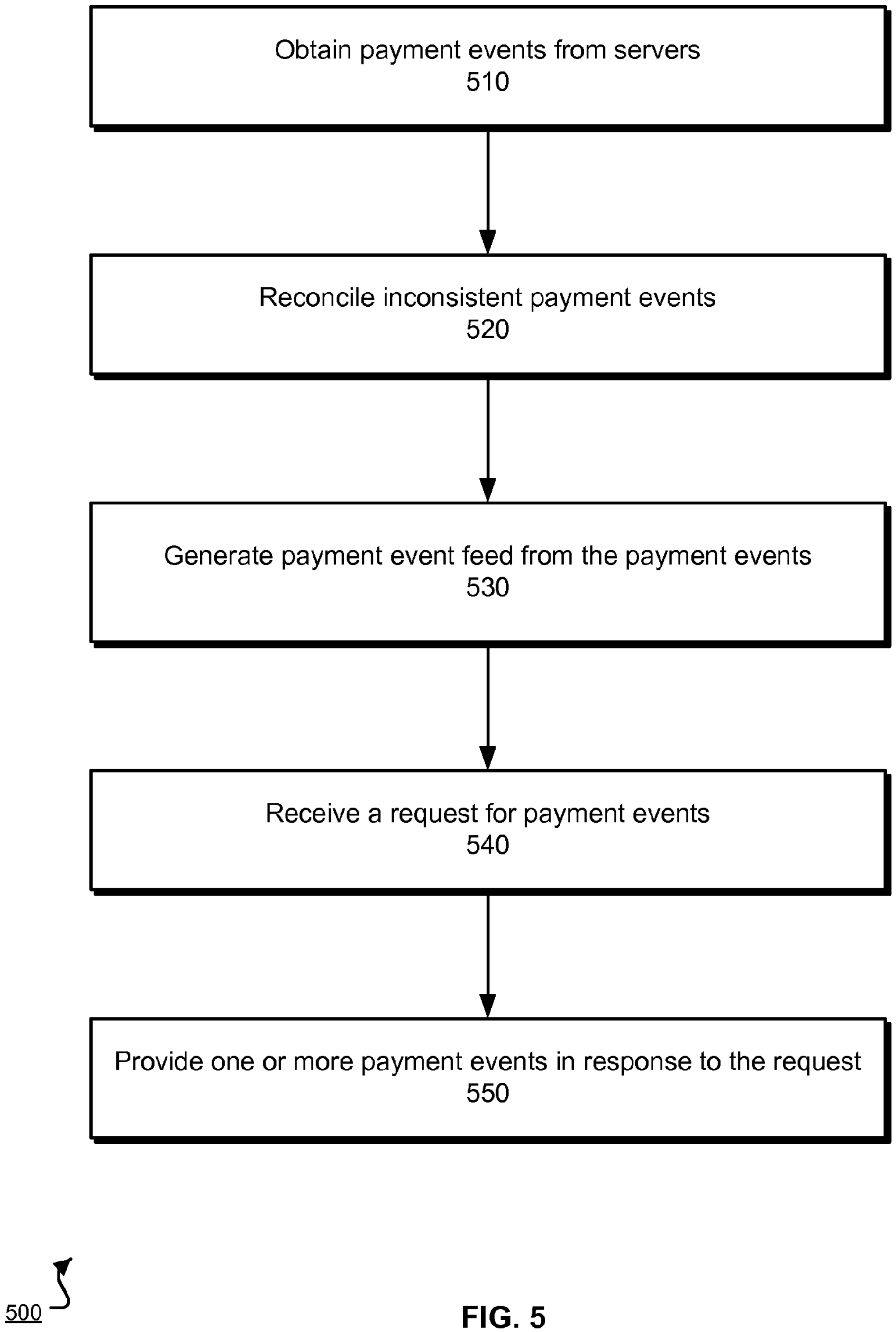
FIG. 5 is a flow chart of an example process for generating a payment event feed.

FIG. 5 is a flow chart of an example process 500 for generating a payment event feed. In general, a payment event engine can receive payment events and generate a payment event feed for consumption by one or more back end processing engines. For convenience, the process 500 will be described as being performed by a system of one or more computers, e.g. the payment service system 108 of FIG. 1.

The system obtains payment events from servers (510). Each of the payment events is associated with a particular payment transaction. Each of the servers can be a device that requests and obtains authorization for payment transactions received from merchants. The servers can be located in a same datacenter or can separated by great distances and be located in different geographic regions.

The system reconciles inconsistent payment events from the plurality of payment events (520). Some of the received payment events for a particular payment transaction may be inconsistent. For example, the system may receive a payment event for a capture and a payment event for a void in a same transaction. The system can resolve the inconsistent payment events using established transaction protocols. In some cases, resolving the inconsistent payment events may require ignoring or discarding one or more of the received payment events.

The system generates a payment event feed from the plurality of reconciled payment events (530). The system can assign identifiers to each of the payment events, for example, as described above with reference to FIG. 4. The system can maintain the payment event feed in an order determined by the payment event identifiers of the payment events. The system can also ensure that each payment event associated with a payment transaction occurs in the payment feed no more than once.

The system receives a request for one or more payment events (540). For example, the system can receive the request from one or more back end processing engines. The processing engines can, for example, request a number of the most-recently added payment events on the payment event feed. The processing engines can also specify an identifier to request all payment events that occur on the payment event feed after the specified identifier. That is, payment events with a higher identifier, in the case that identifiers are assigned monotonically increasing numbers.

In response to the request, the system can provide one or more payment events from the payment event feed (550). For example, the system can provide payment events to a back end processing engine that stores the payment events at multiple geographically-diverse sites in order to keep the multiple sites in sync and to facilitate disaster recover mechanisms.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims. For example, predicting approval of transactions may not be limited to being implemented on a mobile device but could also be applied to other environments, such as a payment service system. Usage of the techniques to predict approval could also be applied to non-mobile or wired devices connected to a network. Although the swiping of a card through a reader is described above, other techniques for scanning a card, e.g., chip reading or near field communication, could be used to read data from the card.

What is claimed is:

1. A system comprising:

one or more processing engines that are configured to periodically consume payment events from a payment event feed that comprises a list of payment events in an order;

an authorization server that generates the payment events on the payment event feed, wherein the authorization server performs operations comprising:

receiving a request for authorization of a payment transaction from a merchant conducting a transaction with a customer having an account with a payment service system, generating a first payment event representing the request for authorization being received from the merchant and adding the first payment event as a distinct payment event to the payment event feed, sending a request for authorization for the payment transaction to a card issuer of the customer, generating a second payment event representing the request for authorization being sent to the card issuer of the customer and adding the second payment event as a distinct payment event to the payment event feed, receiving an indication from the card issuer of the customer that the payment transaction has been authorized, generating a third payment event representing the indication that the payment transaction has been authorized being received from the card issuer of the customer and adding the third payment event as a distinct payment event to the payment event feed, and sending authorization to the merchant for the payment transaction before receiving acknowledgment that any of the one or more processing engines have accessed any of the payment events on the payment event feed for the payment transaction; and a payment event engine that performs operations comprising:

receiving, from a particular processing engine of the one or more processing engines, a request for payment events, wherein the request includes an identifier of a last-retrieved payment event by the particular processing engine, and providing, to the particular processing engine, a plurality of payment events having identifiers later in the order than the identifier of the last-retrieved payment event, including providing a plurality of distinct payment events respectively representing each of the steps of the payment transaction between the merchant and the customer.

2. The system of claim 1, wherein each processing engine maintains a reference to a last-retrieved payment event, and requests payment events on the payment event feed by specifying the identifier of the last retrieved payment event.

3. The system of claim 1, wherein payment events on the payment event feed are ordered by payment event identifiers.

4. The system of claim 1, wherein the server is further configured to reconcile inconsistent payment events in the list of payment events.

5. The system of claim 1, wherein the one or more processing engines include:
- an analytics engine to compute statistics related to payment transactions;
- a risk engine to identify trends in payment events that indicate an increased risk of fraud; and
- a settlement engine to process payment events to finalize transactions.

6. A computer-implemented method comprising:
- receiving, at a server in a payment service system that includes a plurality of processing engines for processing payment events, a request for authorization of a payment transaction from a merchant, the plurality of processing engines including:
  - an analytics engine to compute statistics related to payment transactions;
  - a risk engine to identify trends in payment events that indicate an increased risk of fraud; and
  - a settlement engine to process payment events to finalize transactions;
- receiving an indication that the payment transaction has been authorized;
- in response to receiving the indication that the payment transaction has been authorized, providing authorization for the payment transaction to the merchant without first receiving acknowledgment that the processing engines have received the indication that the payment transaction has been authorized;
- generating a plurality of distinct payment events associated with the payment transaction, including converting steps of the payment transaction into multiple payment events, wherein each payment event has a unique identifier;
- receiving a request for payment events from a particular processing engine of the plurality of processing engines; and
- responding to the request for payment events by providing, to the particular processing engine, payment events that satisfy the request, including providing the plurality of distinct payment events representing the steps of the payment transaction.

7. The method of claim 6, further comprising generating the unique identifier for each payment event, wherein the unique identifier is based on a time based ordering in which the payment events occurred.

8. The method of claim 6, further comprising generating respective unique identifiers for the payment events as monotonically increasing numbers.

9. The method of claim 7, further comprising generating a payment event feed from the one or more payment events, wherein the payment event feed comprises a list of payment events ordered by respective payment event identifiers.

10. The method of claim 9, wherein generating the payment event feed comprises reconciling inconsistent payment events from the plurality of payment events.

11. The method of claim 6, wherein the request specifies an identifier of a last-retrieved payment event, and wherein providing payment events that satisfy the request comprises providing payment events having identifiers greater than the identifier of the last-retrieved payment event.

12. The method of claim 6, wherein providing the plurality of distinct payment events representing the steps of the payment transaction comprises providing a first payment event representing a request for authorization being received from the merchant, a second payment event representing a request for authorization being sent to a card issuer of a customer, and a third payment event representing an indication that the payment transaction has been authorized being received from the card issuer of the customer.

13. A system comprising:
- one or more computers and one or more storage devices including a plurality of processing engines configured to process payment events and storing instructions that are operable, when executed by the one or more computers, to cause the one or more computers to perform operations comprising:
  - receiving a request for authorization of a payment transaction from a merchant;
  - receiving an indication that the payment transaction has been authorized;
  - providing authorization for the payment transaction to the merchant without receiving acknowledgment that the processing engines have received the indication that the payment transaction has been authorized;
  - generating a plurality of distinct payment events associated with the payment transaction, including converting steps of the payment transaction into multiple payment events, wherein each payment event has a unique identifier;
  - receiving a request for payment events from a particular processing engine of the plurality of processing engines; and
  - providing, to the particular processing engine, payment events that satisfy the request including providing the plurality of distinct payment events representing steps of the payment transaction.

14. The system of claim 13, wherein the operations further comprise generating the unique identifier for each payment event, wherein the unique identifier is based on a time based ordering in which the payment events occurred.

15. The system of claim 13, wherein the operations further comprise generating respective unique identifiers for the payment events as monotonically increasing numbers.

16. The system of claim 14, wherein the operations further comprise generating a payment event feed from the one or more payment events, wherein the payment event feed comprises a list of payment events ordered by respective payment event identifiers.

17. The system of claim 16, wherein generating the payment event feed comprises reconciling inconsistent payment events from the plurality of payment events.

18. The system of claim 13, wherein the request specifies an identifier of a last-retrieved payment event, and wherein providing payment events that satisfy the request comprises providing payment events having identifiers greater than the identifier of the last-retrieved payment event.

19. The system of claim 13, wherein providing the plurality of distinct payment events representing the steps of the payment transaction comprises providing a first payment event representing a request for authorization being received from the merchant, a second payment event representing a request for authorization being sent to a card issuer of a customer, and a third payment event representing an indication that the payment transaction has been authorized being received from the card issuer of the customer.

20. A non-transitory machine-readable storage medium for use in a computer system that includes one or more processing engines for processing payment events, the non-transitory machine-readable storage medium storing a set of instructions, an execution of which causes the computer system to perform a process comprising:

receiving a request for authorization of a payment transaction from a merchant;

receiving an indication that the payment transaction has been authorized;

providing authorization for the payment transaction to the merchant without receiving acknowledgment that the one or more processing engines have received the indication that the payment transaction has been authorized;

generating a plurality of distinct payment events associated with the payment transaction, including converting steps of the payment transaction into multiple payment events, wherein each payment event has a unique identifier;

receiving a request for payment events from a particular processing engine of the one or more processing engines; and in response to the request for payment events, providing, to the particular processing engine, payment events that satisfy the request, including providing the plurality of distinct payment events representing the steps of the payment transaction.

21. The non-transitory machine-readable storage medium of claim 20, further comprising instructions, an execution of which causes the computer system to perform:

generating the unique identifier for each payment event, wherein the unique identifier is based on a time based ordering in which the payment events occurred.

22. The non-transitory machine-readable storage medium of claim 20, further comprising instructions, an execution of which causes the computer system to perform:

generating respective unique identifiers for the payment events as monotonically increasing numbers.

23. The non-transitory machine-readable storage medium of claim 21, further comprising instructions, an execution of which causes the computer system to perform:

generating a payment event feed from the one or more payment events, wherein the payment event feed comprises a list of payment events ordered by respective payment event identifiers.

24. The non-transitory machine-readable storage medium of claim 23, wherein generating the payment event feed comprises reconciling inconsistent payment events from the plurality of payment events.

25. The non-transitory machine-readable storage medium of claim 20, wherein the one or more processing engines include at least three of:

an analytics engine to compute statistics related to payment transactions;

a risk engine to identify trends in payment events that indicate an increased risk of fraud;

a settlement engine to process payment events to finalize transactions; or a backup processing engine to request payment events from the payment event feed and to distribute the payment events to multiple geographically diverse sites.

* * * * *